(12) United States Patent  (10) Patent No.: US 8,582,042 B2
Kashiwagi et al.  (45) Date of Patent: Nov. 12, 2013

(54) STEREOSCOPIC IMAGE DISPLAY APPARATUS

(75) Inventors: Masako Kashiwagi, Yokohama (JP); Tatsuo Saishu, Tokyo (JP); Rieko Fukushima, Tokyo (JP); Yuzo Hirayama, Yokohama (JP); Yoshiharu Momonoi, Yokohama (JP); Ayako Takagi, Yokosuka (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 492 days.

(21) Appl. No.: 12/884,048

(22) Filed: Sep. 16, 2010

(65) Prior Publication Data

US 2011/0187948 A1 Aug. 4, 2011

(30) Foreign Application Priority Data

Feb. 4, 2010 (JP) ................................. 2010-023526

(51) Int. Cl.
*G02F 1/1335* (2006.01)
*G02F 1/1343* (2006.01)

(52) U.S. Cl.
USPC ........................................... 349/15; 349/146

(58) Field of Classification Search
None
See application file for complete search history.

(56) References Cited

U.S. PATENT DOCUMENTS 5,953,148 A * 9/1999 Moseley et al. ............... 359/237
6,118,584 A * 9/2000 Van Berkel et al. ........... 359/463

FOREIGN PATENT DOCUMENTS

| JP | 3525995 | 2/2004 |
| JP | 4010564 | 9/2007 |
| JP | 2008-249887 | 10/2008 |
| JP | 4197716 | 10/2008 |

* cited by examiner

*Primary Examiner* — Tina Wong
(74) *Attorney, Agent, or Firm* — Finnegan, Henderson, Farabow, Garrett & Dunner, L.L.P.

(57) ABSTRACT

Certain embodiments provide a display device a plurality of subpixels arranged in a first direction and a second direction perpendicular to the first direction to form a matrix, and each having an aperture provided with a color component; and an optical controller provided to be opposed to the display device having a plurality of rectilinear optical apertures extending in the second direction are arranged in the first direction. A shape of the aperture in the subpixel is depending upon a condition that the apertures in the subpixels adjacent to each other in the first direction have a nonoverlapping region which is a nonoverlapping region in the second direction and a condition that an aperture ratio indicating a ratio of the aperture to the subpixel in length in the second direction is substantially constant in one line in the second direction irrespective of a position in the first direction.

5 Claims, 8 Drawing Sheets

STEREOSCOPIC IMAGE DISPLAY APPARATUS

CROSS-REFERENCE TO RELATED APPLICATION

This application is based upon and claims the benefit of priority from prior Japanese Patent Application No. 2010-23526 filed on Feb. 4, 2010 in Japan, the entire contents of which are incorporated herein by reference.

FIELD

Embodiments described herein relate to a stereoscopic image display apparatus.

BACKGROUND

There is a stereoscopic image display apparatus in which an optical control element (such as a slit or a lenticular sheet) serving as a parallax barrier is provided in front of a display panel such as a liquid crystal panel or a plasma panel in order to makes it possible for a viewer to perceive a stereoscopic image by naked eyes.

In such a stereoscopic image display apparatus, unevenness (moiré) of light and darkness in brightness is caused by interference between a periodic structure of a pixel aperture of the display panel and a periodic structure of an aperture of the optical control element.

For reducing the moiré, for example, in a stereoscopic image display apparatus described in JP-A 2008-249887 (KOKAI), the shape and arrangement of subpixels are contrived to cause the aperture length in the column direction of apertures of a plurality of subpixels which are adjacent in the row direction to vary in a single row and become constant in sum of a plurality of rows.

In the above-described stereoscopic image display apparatus, moiré is reduced. However, there is a problem that roughness of luminance is caused. For example, in the stereoscopic image display apparatus described in JP-A 2008-249887 (KOKAI), luminance roughness in the column direction is caused.

DETAILED DESCRIPTION

Certain embodiments provide a display device a plurality of subpixels arranged in a first direction and a second direction perpendicular to the first direction to form a matrix, and each having an aperture provided with a color component; and an optical controller provided to be opposed to the display device having a plurality of rectilinear optical apertures extending in the second direction are arranged in the first direction. A shape of the aperture in the subpixel is depending upon a condition that the apertures in the subpixels adjacent to each other in the first direction have a nonoverlapping region which is a nonoverlapping region in the second direction and a condition that an aperture ratio indicating a ratio of the aperture to the subpixel in length in the second direction is substantially constant in one line in the second direction irrespective of a position in the first direction.

Hereafter, a stereoscopic image display apparatus according to embodiments will be described more specifically with reference to the drawings.

Throughout the description and the drawings, the same elements as those already described with reference to a drawing are denoted by like reference characters, and detailed description thereof will not be repeated.

First Embodiment

Figure 1:
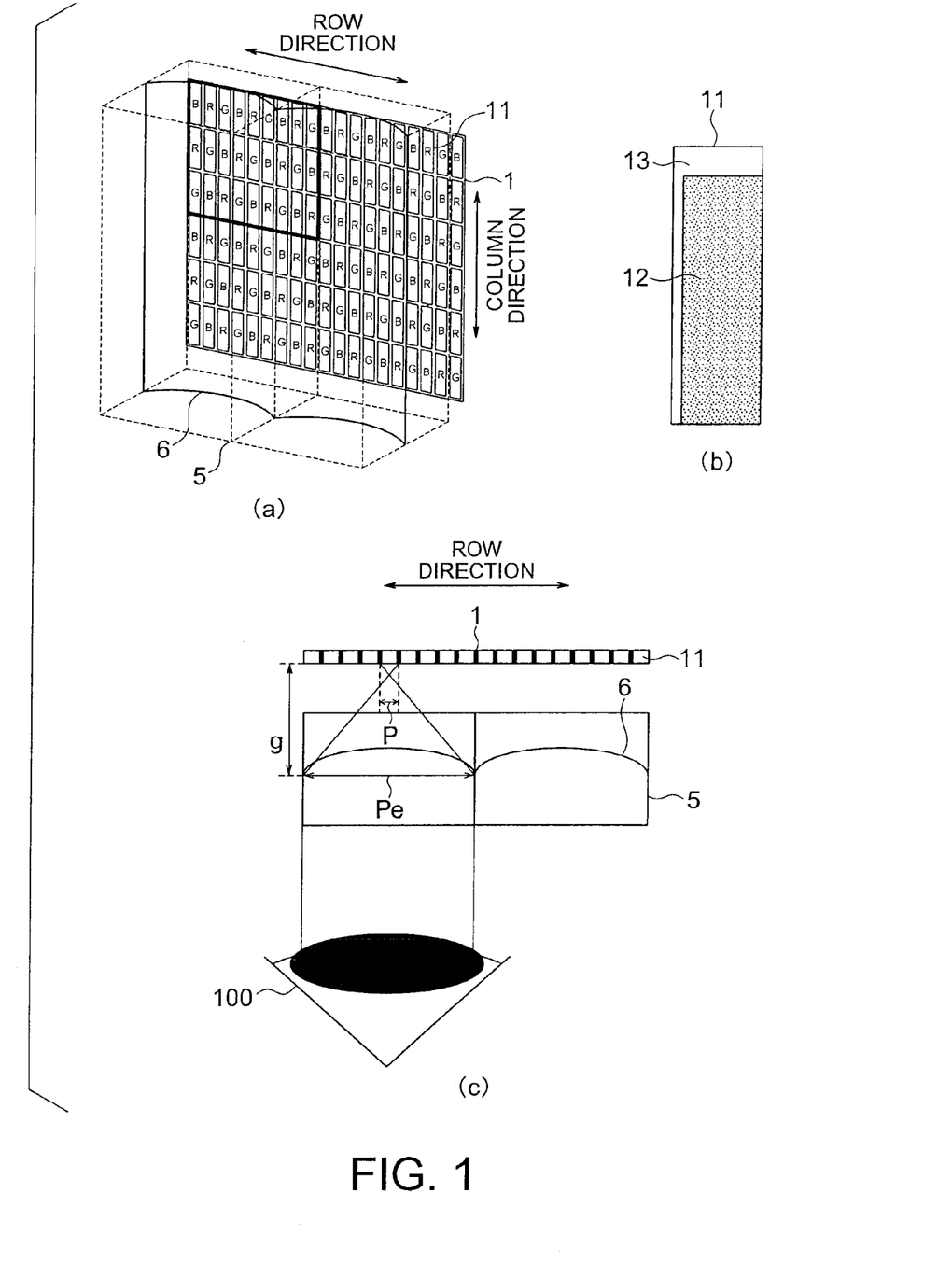
FIGS. 1(a), 1(b) and 1(c) are schematic diagrams showing a configuration of a part of a stereoscopic image display apparatus according to a first embodiment.

FIGS. 1(a), 1(b) and 1(c) are schematic diagrams showing a configuration of a part of a stereoscopic image display apparatus according to a first embodiment. FIG. 1(a) is an oblique view of a part of the stereoscopic image display apparatus. FIG. 1(b) is a diagram showing a subpixel 11. FIG. 1(c) is a diagram showing a state in which a part of the stereoscopic image display apparatus is viewed from the column direction side.

As shown in FIG. 1(a), a color filter 1 is disposed on the front face of a display unit (not illustrated) such as a liquid crystal panel, and a lenticular sheet 5 is disposed at a predetermined distance from the color filter 1. In the color filter 1, a plurality of subpixels 11 each having a length of 3 in the column direction and a length of 1 in the row direction are arranged in each of the row direction and the column direction to form a matrix. Each of the subpixels 11 has one of three color components. In the color filter 1, subpixels 11 having color components of red (R), green (G), and blue (B) are mosaic-arranged to appear by turns in the row direction and the column direction. The lenticular sheet 5 has a structure in which a plurality of cylindrical lenses 6 each of which is an optical aperture and which extends in the column direction are arranged in the row direction.

FIG. 1(b) shows one subpixel 11. The subpixel 11 includes an aperture 12 and a shield 13. The aperture 12 is a region which adds a color component to light from a backlight (not illustrated) disposed in the rear of the display device and which passes resultant light. The shield 13 is a region which intercepts light from the backlight. Elements such as electrodes and signal lines which will be described later are provided in the shield 13.

As shown in FIG. 1(c), light included in light which has passed through the color filter 1 and included in the range of a condensing width P passes through one cylindrical lens 6 in the lenticular sheet 5 and arrives at one eye 100 of a viewer who exists at a specific position. The condensing width P is a width of light condensed by the cylindrical lens 6, and the condensing width P depends upon a gap g which is a distance between the lenticular sheet 5 and the color filter 1 and a lens width Pe of one cylindrical lens 6

Different light beams are caused to arrive at the right eye and left eye by using the lenticular sheet 5. As a result, the viewer can perceive a stereoscopic image by the naked eyes.

Figure 2:
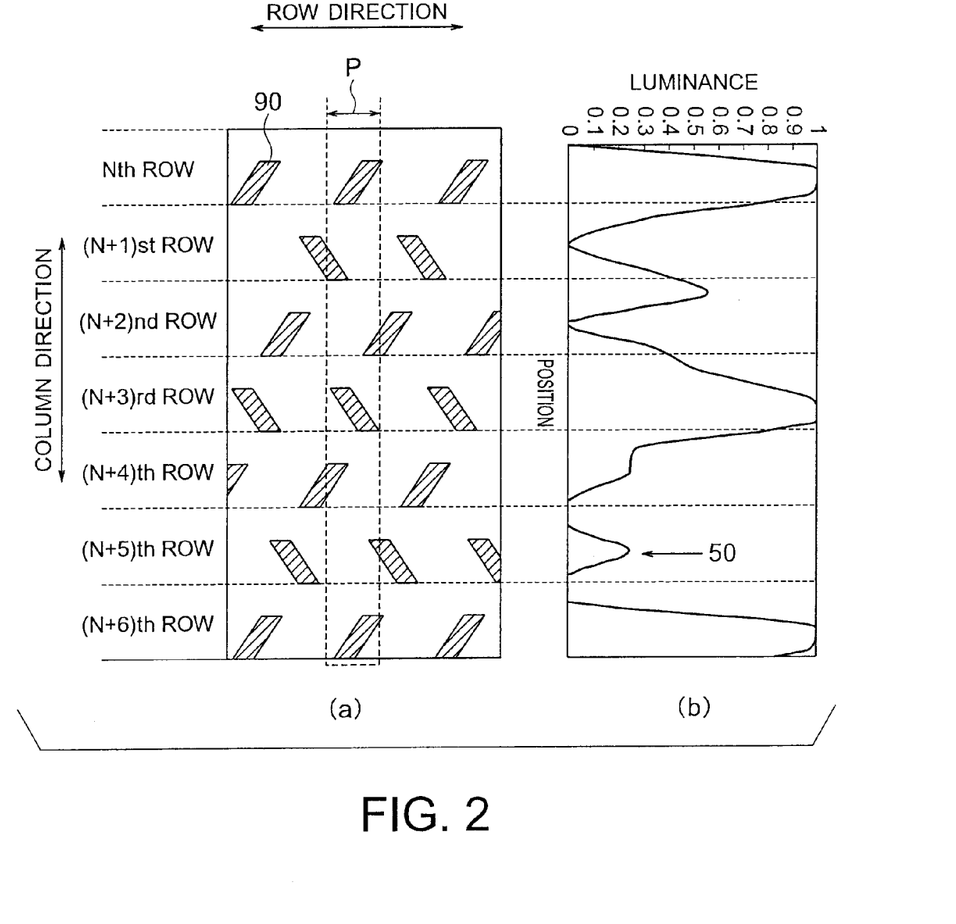
FIGS. 2(a) and 2(b) are reference diagrams for explaining roughness of luminance in the column direction.

Roughness of luminance in the column direction will now be described. FIGS. 2(a) and 2(b) are reference diagrams for explaining the luminance roughness in the column direction. FIG. 2(a) shows shapes and arrangements of subpixels in the case where the sum of aperture ratios of apertures 90 in two rows becomes constant in any position in the row direction. The aperture ratio is an aperture ratio of apertures to subpixels in the column direction. The arrangement of subpixels is a mosaic arrangement. For brevity, only apertures 90 of subpixels having the same color component are shown in FIG. 2(a). In FIG. 2, the subpixel arrangement is repeated with a repetition period of six rows. In other words, the subpixel arrangement ranging from the Nth row to the Nth row to the (N+5)th row is repeated from the (N+6)th row.

A graph in FIG. 2(b) shows a magnitude of luminance of light which passes through the apertures 90 of subpixels included in the condensing width P and arrives at eyes of the viewer as a function of the position in the column direction. The ordinate axis represents the position in the column direction and the abscissa axis represents the normalized luminance. The scale of the ordinate axis in the graph shown in FIG. 2(b) is squared with the scale in the column direction shown in FIG. 2(a).

When viewing from one viewpoint direction, the viewer perceives light arriving from the apertures 90 of subpixels included in the range of the condensing width P. The luminance of the light depends upon the area of the apertures 12 of the subpixels. The larger the area becomes, the greater the luminance also becomes. Depending upon the position in the column direction, therefore, the luminance felt by the viewer differs. In FIGS. 2(a) and 2(b), a peak 50 of luminance at the (N+5)th row is lower than other peaks. Even if all subpixels having the same color component are lit with the same luminance in FIGS. 2(a), 2(b), therefore, the (N+5)th row becomes darker than other rows. Since this is repeated with a period which is as coarse as six rows, luminance roughness in the column direction is generated.

The stereoscopic image display apparatus according to the present embodiment makes it possible to prevent the moiré and reduce the luminance roughness in the column direction by providing the shape of the aperture of the subpixel 11 with a feature.

Figure 3:
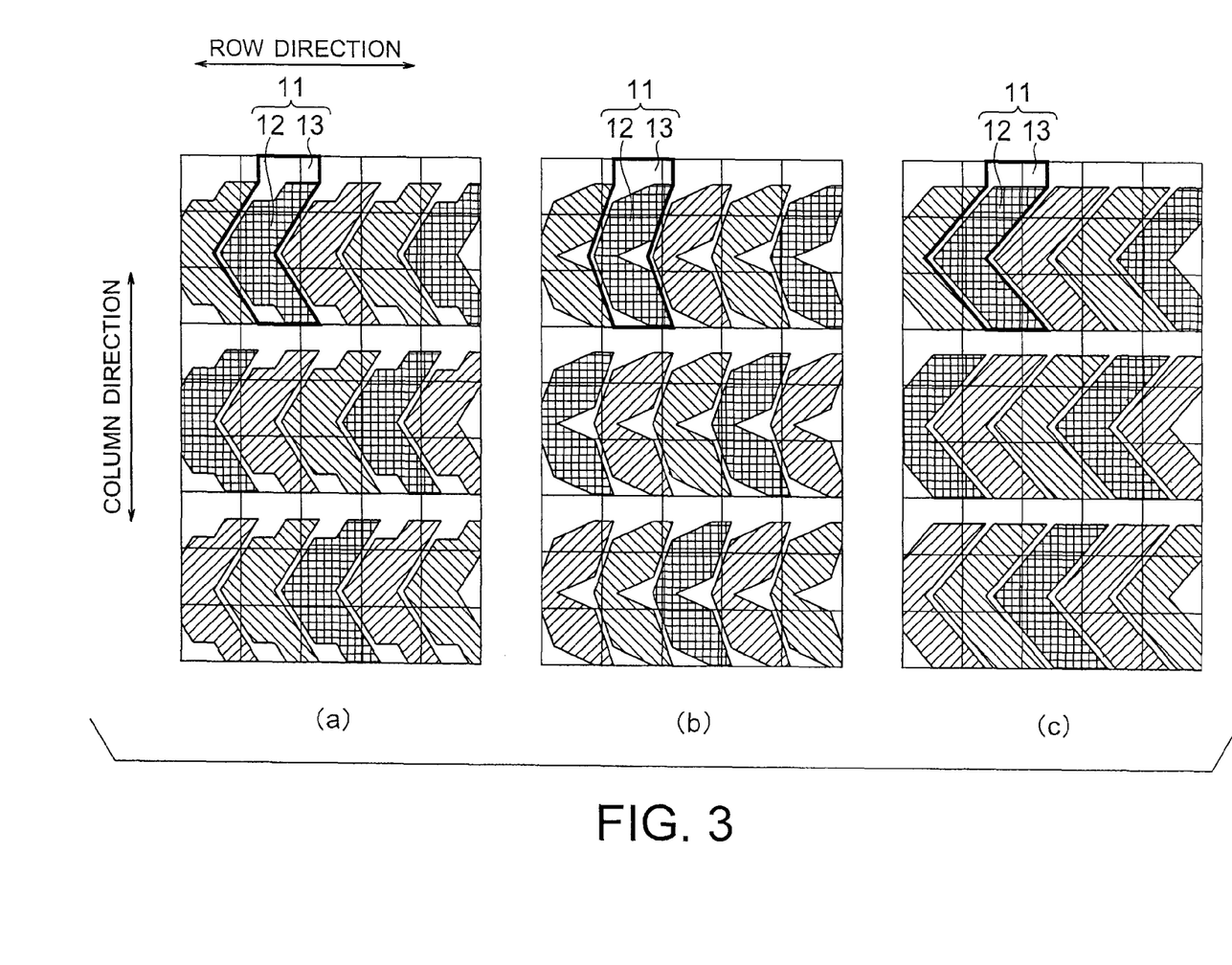
FIGS. 3(a), 3(b) and 3(c) are enlarged diagrams of a part of a display unit in the stereoscopic image display apparatus according to the first embodiment.

FIGS. 3(a) to 3(c) are enlarged diagrams of a part of a display unit in the stereoscopic image display apparatus according to the first embodiment. Each of FIGS. 3(a) to 3(c) shows an example of the shape of the aperture 12 of the subpixel 11 and the color arrangement. FIG. 3(a) shows a first shape example of the aperture 12. FIG. 3(b) shows a second shape example of the aperture 12. FIG. 3(c) shows a third shape example of the aperture 12. The shape of the aperture 12 will be described later. In FIGS. 3(a), 3(b), 3(c), a region corresponding to three rows by five columns of subpixels is shown, and square measures each having a length of one subpixel 11 in the row direction as one side are drawn as additional lines. Each hatched region represents the aperture 12 (the same hatch patterns represent the like color components) and plain regions represent shield (black matrix). In FIG. 3, regions surrounded by thick lines are subpixels 11.

FIGS. 4(a) to 4(c) are diagrams showing apertures 12 of subpixels 11 and variations of the column direction aperture ratio in the row direction. Upper diagrams show shapes and arrangements of the apertures 12 of the subpixels 11. Lower diagrams show graphs obtained by accumulating the aperture ratio in the row direction, and white color regions represent the aperture ratio. FIG. 4(a) is a diagram showing a first shape example, and FIG. 4(a) corresponds to FIG. 3(a). FIG. 4(b) is a diagram showing a second shape example, and FIG. 4(b) corresponds to FIG. 3(b). FIG. 4(c) is a diagram showing a third shape example, and FIG. 4(c) corresponds to FIG. 3(c). In each of FIGS. 4(a) to 4(c), a region corresponding to one row by three columns is shown.

Figure 4:
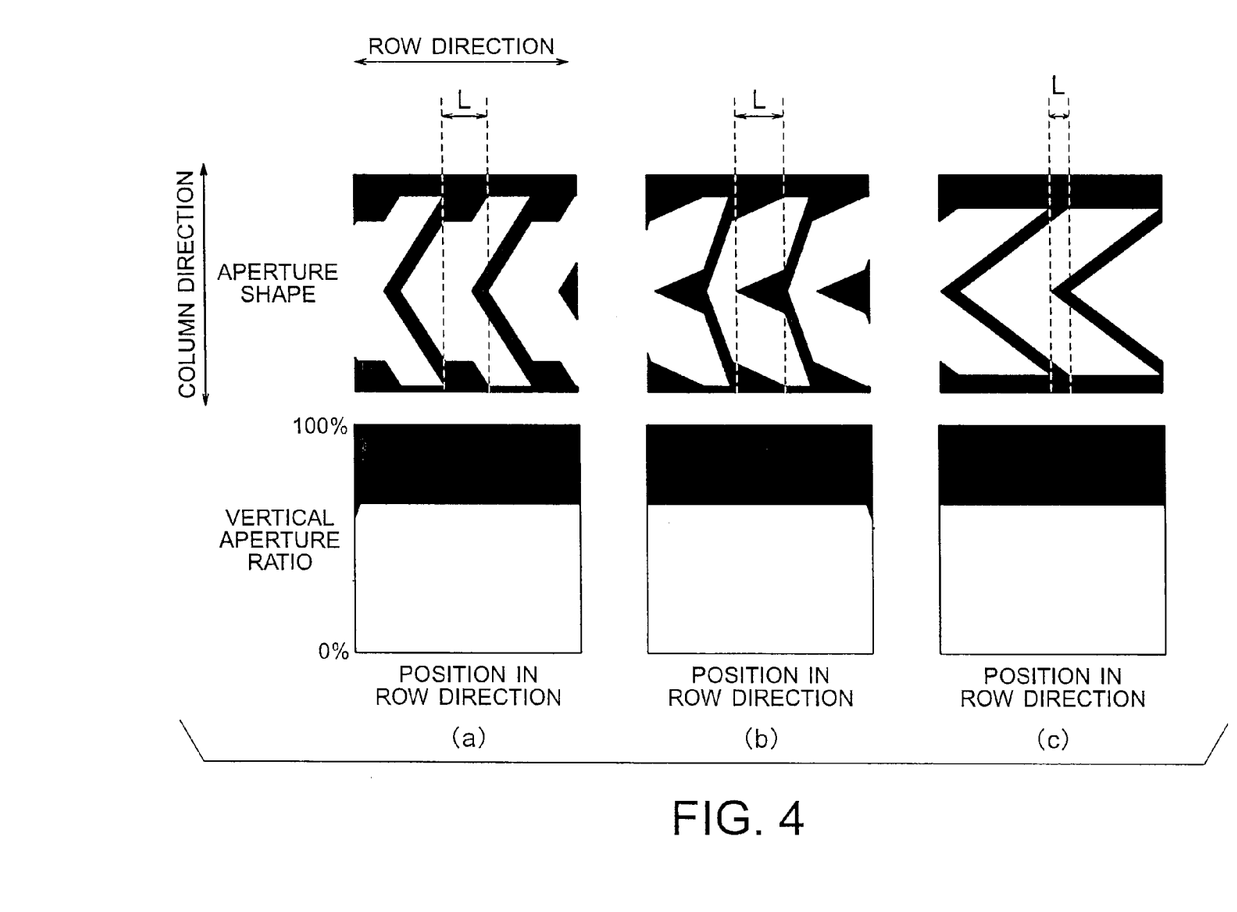
FIGS. 4(a), 4(b) and 4(c) are diagrams showing apertures 12 of subpixels 11 and variations of the column direction aperture ratio in the row direction.

In the present embodiment, the shape of the aperture 12 of the pixel 11 is determined on the basis of the following two conditions. A first condition is that adjacent subpixels 11 have a nonoverlapping region. The nonoverlapping region is a region denoted by "L" in FIG. 4, and it refers to a region where one subpixel 11 and a subpixel 11 adjacent thereto do not overlap in a coordinate in the row direction.

A second condition is that in one row the aperture ratio of the subpixel 11 is constant in any position in the row direction as shown in FIGS. 4(a) to 4(c).

The shape of the aperture 12 of the subpixel 11 described hereafter is determined on the basis of these conditions.

Figure 5:
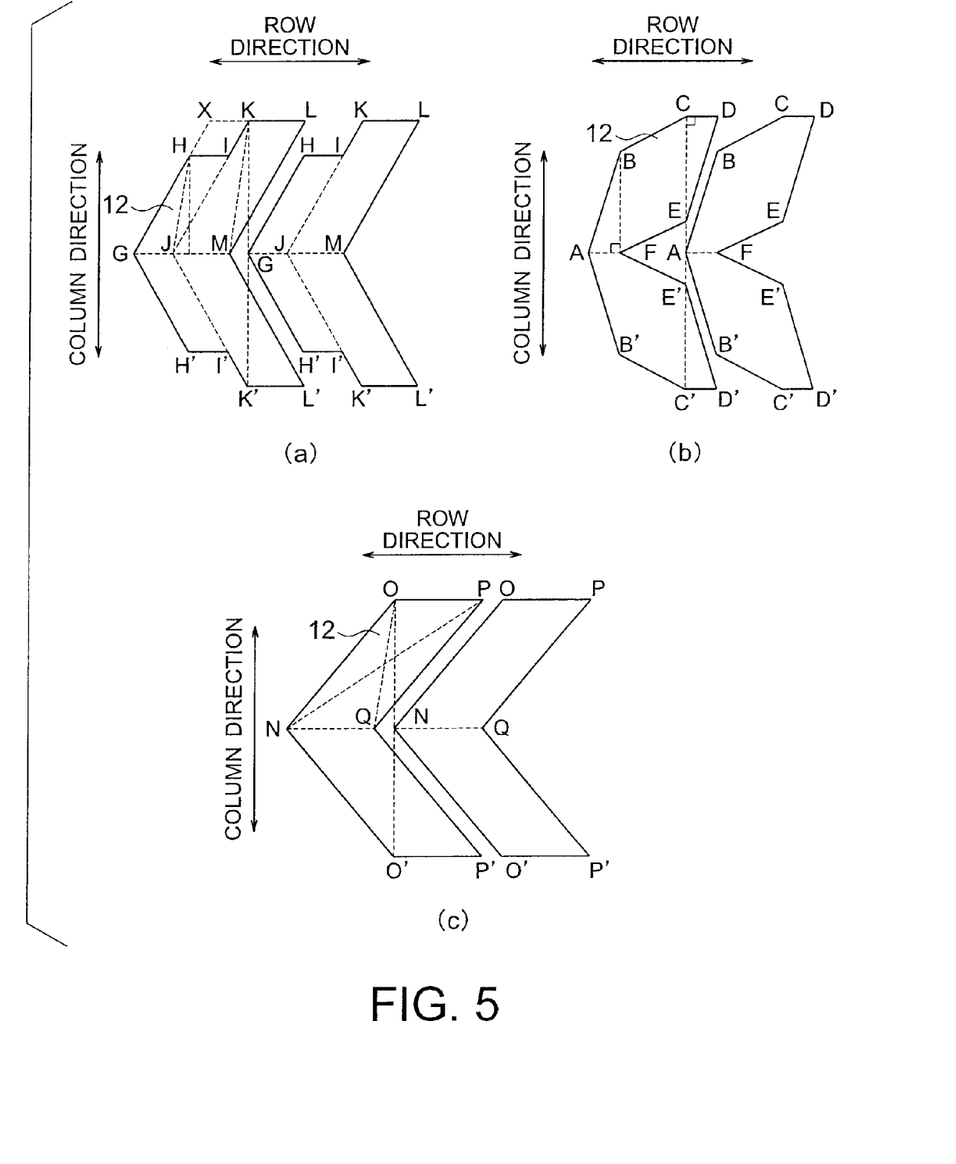
FIGS. 5(a), 5(b) and 5(c) are diagrams showing shapes of an aperture 12 of one subpixel 11.

FIGS. 5(a) to 5(c) is a diagram showing shapes of an aperture 12 of one subpixel 11. FIG. 5(a) is a diagram showing a first shape example, and FIG. 5(a) corresponds to FIG. 3(a). FIG. 5(b) is a diagram showing a second shape example, and FIG. 5(b) corresponds to FIG. 3(b). FIG. 5(c) is a diagram showing a third shape example, and FIG. 5(c) corresponds to FIG. 3(c).

The first shape example will now be descried. As shown in FIG. 5(a), the first shape example of the aperture 12 includes a hexagon GHIKLM obtained by combining two parallelograms GHIJ and JKLM which are different from each other in area and which are parallel in sides intersecting a base, in an L form, and an L-shaped hexagon GH'I'K'L'M which is linear-symmetrical to the hexagon GHIKLM.

In the parallelogram GHIJ, a triangle GHJ obtained by dividing the parallelogram GHIJ into halves with a shorter diagonal line HJ is an obtuse-angle triangle. In other words, in the parallelogram GHIJ, a perpendicular line drawn from a vertex H in the height direction (column direction) does not intersect a side GJ, but intersects an extension line of the side GJ extended in the direction.

In the parallelogram JKLM, a triangle JKM obtained by dividing the parallelogram JKLM into halves with a shorter diagonal line KM is an obtuse-angle triangle. In other words, in the parallelogram JKLM, a perpendicular line drawn from a vertex K in the height direction does not intersect a side JM, but intersects an extension line of the side JM extended in the M direction.

The hexagon GHIKLM is obtained by combining the parallelogram GHIJ and the parallelogram JKLM so as to square the side IJ with the side JK and dispose the side GJ and the side JM on one straight line. As a result, the hexagon GHIKLM takes a shape obtained by removing a parallelogram HXKI from a parallelogram GXLM.

The first shape example of the aperture 12 of the subpixel 11 takes a shape obtained by concatenating the hexagon GHIKLM with the hexagon GH'I'K'L'M, which is linear-symmetrical to the hexagon GHIKLM about the side GM of the hexagon GHIKLM serving as a symmetry axis.

A figure GHIKLML'K'I'H' taking the shape obtained by concatenating the hexagons has three sets of sides having the same inclination. In other words, the figure GHIKLML'K'I'H' has a set of "a side GH, a side IK and a side ML", a set of "a side GH', a side I'K' and a side ML", and a set of "a side KL and a side K'L'."

A plurality of subpixels 11 each having the aperture 12 which takes the shape are arranged to cause diagonal lines GM of respective apertures 12 to be parallel to the row direction and cause the diagonal lines GM of the respective apertures 12 to be on the same straight line. And the subpixels 11 are arranged to cause a vertex G of an aperture 12 of an adjacent subpixel 11 (a right adjacent subpixel 11 in FIG. 5(a)) to exist on a segment of a line coupling the vertex K and the vertex K' of the aperture 12 of one subpixel 11.

A series of subpixels 11 in one row which satisfies the above-described two conditions is formed by repeating the arrangement in the row direction. Subpixels 11 are arranged in a matrix form by repeating the series of subpixels in one row, in the column direction.

The second shape example will now be described. As shown in FIG. 5(b), the second shape example of the aperture 12 is a shape obtained by concatenating a hexagon (parallelo-hexagon) ABCDEF having three sets of opposite sides parallel and equal with a parallelo-hexagon AB'C'D'E'F which is linear-symmetrical to the parallelo-hexagon ABCDEF about one side AF serving as a symmetry axis. In the parallelo-hexagon ABCDEF, the side AF is perpendicular to a diagonal line BF. In other words, in the parallelo-hexagon ABCDEF, a vertex B exists on a straight line which passes through a vertex F and which is perpendicular to the side AF.

An extension line of the side AF is perpendicular to an extension line of a diagonal line CE. In other words, in the parallelo-hexagon ABCDEF, a vertex B exists on a straight line which passes through a vertex F and which is perpendicular to the side AF. The side CD is perpendicular to the diagonal line CE.

As a result, the parallelo-hexagon ABCDEF takes a shape obtained by combining one parallelogram with two right-angled triangles.

The figure ABCDEFE'D'C'B' taking a shape obtained by concatenating the two parallelo-hexagons has five sets of sides having the same inclination. In other words, the figure ABCDEFE'D'C'B' has a set of "sides AB and ED," a set of "sides AB' and E'D'," a set of "sides BC and FE," a set of "sides B'C' and FE'," and a set of "sides CD and C'D'."

A plurality of subpixels 11 each having the aperture 12 which takes the shape are arranged to cause diagonal lines AF of respective apertures 12 to be parallel to the row direction and cause the diagonal lines AF of the respective apertures 12 to be on the same straight line. And the subpixels 11 are arranged to cause a vertex A of an aperture 12 of an adjacent subpixel 11 (a right adjacent subpixel 11 in FIG. 5(b)) to exist on a segment of a line coupling the vertex E and the vertex E' of the aperture 12 of one subpixel 11.

A series of subpixels 11 in one row which satisfies the above-described two conditions is formed by repeating the arrangement in the row direction. Subpixels 11 are arranged in a matrix form by repeating the series of subpixels 11 in one row, in the column direction.

The third shape example will now be described. As shown in FIG. 5(c), the third shape example of the aperture 12 takes the shape of "<" and takes a shape obtained by concatenating a parallelogram NOPQ with a parallelogram NO'P'Q which is linear-symmetrical to the parallelogram NOPQ.

In the parallelogram NOPQ, a triangle NOQ obtained by dividing the parallelogram NOPQ into halves with a shorter diagonal line OQ is an obtuse-angle triangle. In other words, in the parallelogram NOPQ, a perpendicular line drawn from a vertex O in the height direction (column direction) does not intersect a side NQ, but intersects an extension line of the side NQ extended in the Q direction.

The third shape example of the aperture 12 of the subpixel 11 takes a shape obtained by concatenating the parallelogram NOPQ with a parallelogram NO'P'Q, which is linear-sym-metrical to the parallelogram NOPQ about the side NQ of the parallelogram NOPQ serving as a symmetry axis.

The figure NOPQP'O' taking a shape obtained by concatenating the two parallelograms has three sets of sides having the same inclination. In other words, the figure NOPQP'O' has a set of "sides NO and QP," a set of "sides NO' and QP'," and a set of "sides OP and O'P'."

A plurality of subpixels 11 each having the aperture 12 which takes the shape are arranged to cause diagonal lines NQ of respective apertures 12 to be parallel to the row direction and cause the diagonal lines NQ of the respective apertures 12 to be on the same straight line. And the subpixels 11 are arranged to cause a vertex N of an aperture 12 of an adjacent subpixel 11 (a right adjacent subpixel 11 in FIG. 5(c)) to exist on a segment of a line coupling the vertex O and the vertex O' of the aperture 12 of one subpixel 11.

A series of subpixels 11 in one row which satisfies the above-described two conditions is formed by repeating the arrangement in the row direction. Subpixels 11 are arranged in a matrix form by repeating the series of subpixels 11 in one row, in the column direction.

As for the shape of the aperture 12 of the subpixel 11, a shape other than the above-described three examples may be used as long as the shape is a line symmetrical shape having a symmetry axis in the row direction and the shape has an odd number of sets of sides having the same inclination.

Figure 6:
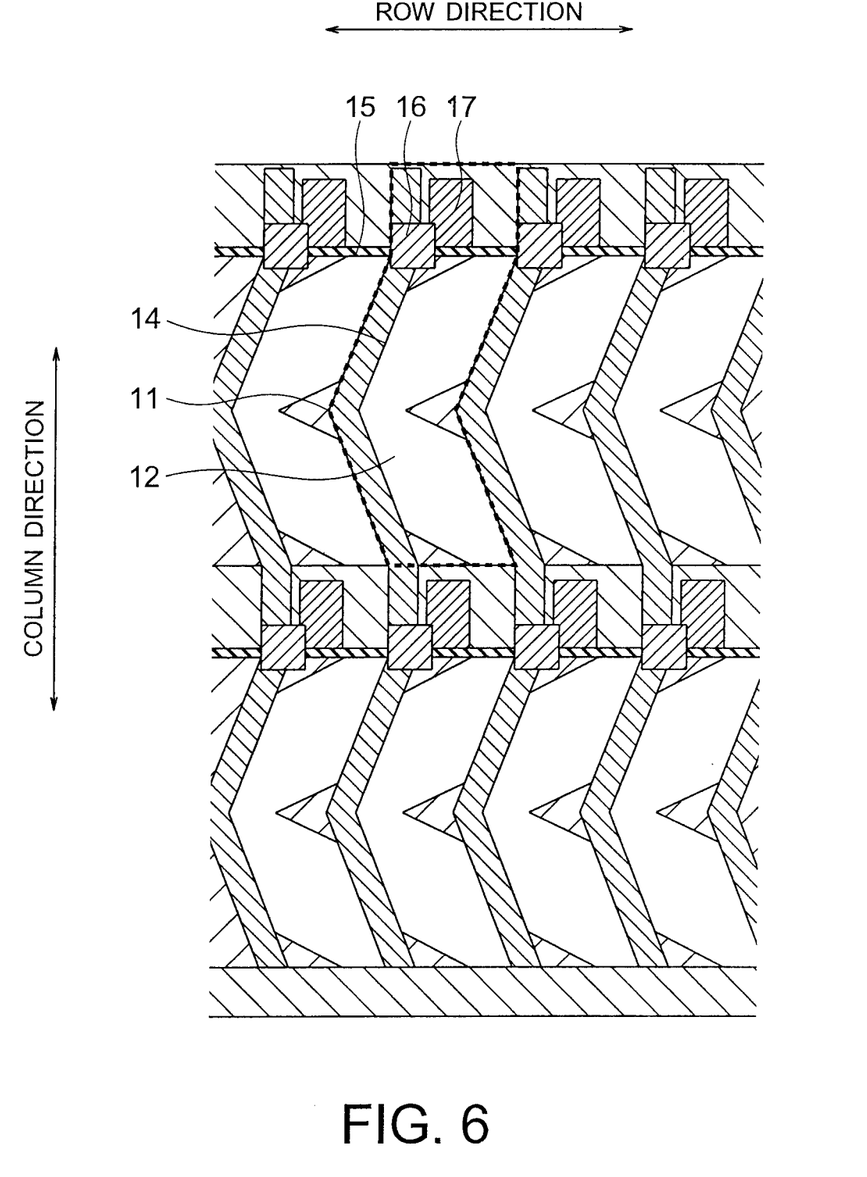
FIG. 6 is a schematic diagram showing details of a subpixel 11.

FIG. 6 is a schematic diagram showing details of a subpixel 11. In FIG. 6, a region of two rows by four columns is shown. In FIG. 6, a plain region represents an aperture 12. The aperture 12 takes the shape of the second shape example shown in FIG. 3. A region surrounded by a dotted line represents one subpixel 11. As described earlier, the subpixel 11 includes the aperture 12 and a shield (not illustrated in FIG. 6).

A signal line 14, a signal line 15, a switch element 16 and an electrode 17 are covered by the shield (not illustrated in FIG. 6) to prevent the viewer from perceiving them. The switch element 16 is a TFT or the like for driving the subpixel 11. The signal line 14 conveys an operation signal to the switch element 16 in one column. The signal line 15 conveys an operation signal to the switch element 16 in one row. The electrode 17 supplies power to the switch element 16. Also in the case of the above-described other shapes of the aperture 12, a similar configuration can be used. The display unit can be activated by this configuration.

In the stereoscopic image display apparatus according to the present embodiment, the moiré can be reduced and the luminance roughness in the column direction can be reduced by providing the aperture 12 of the subpixel 11 with the above-described shape as described heretofore.

Furthermore, bending of the signal line 14 interconnected in the column direction shown in FIG. 6 can be made gentle by providing a nonoverlapping region in two adjacent subpixels 11. As a result, the damage done to the signal line 14 can be reduced, and the strength of the signal line 14 can be maintained.

By the way, as for "parallel," "perpendicular," and "constant" described in the present embodiment, not only perfect parallel, perpendicular and constant, but also errors caused in the manufacturing process and ranges capable of bringing about effects of the present embodiment are included.

Figure 7:
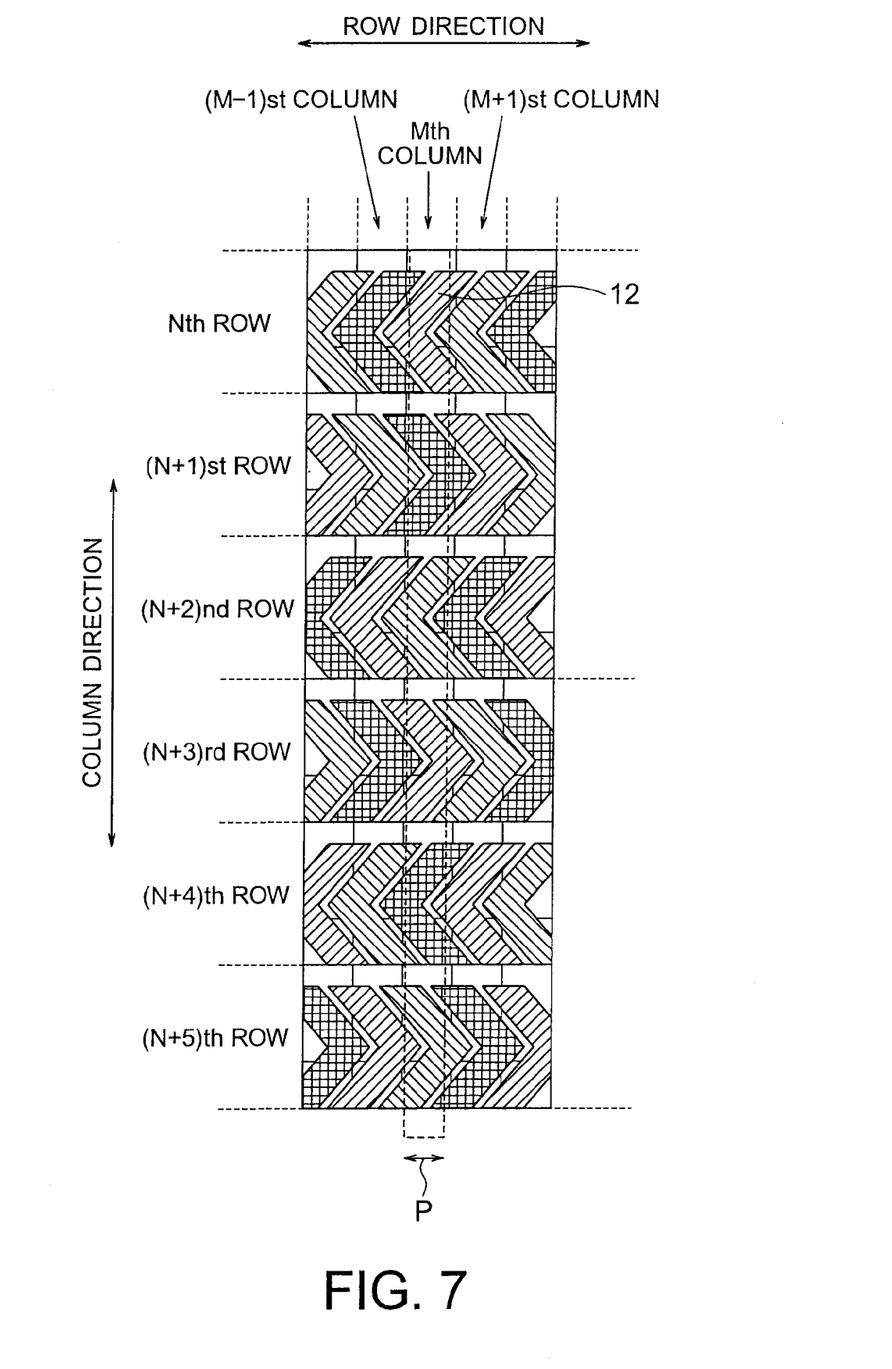
FIG. 7 is a diagram showing subpixels 11 in a third shape example in which an arrangement in the row direction is inverted between one row and the next row.

In the present embodiment, the arrangement of subpixels 11 in the row direction may be inverted in the row direction between one row and the next row. FIG. 7 is a diagram showing subpixels 11 in the third shape example in which the shape of the subpixel 11 is inverted in the row direction between one row and the next row. The same hatch patterns represent like color components. If the subpixels 11 are in the mosaic arrangement, the arrangement of the subpixels 11 in the column direction is repeated with a period of six rows. The Nth row to the (N+5)th row form one period.

In this case, it is desirable to make the area of apertures 12 of the same subpixels 11 included in the range of the condensing width P (for example, wavy lines in FIG. 7) substantially equal in three rows in the former half (the Nth row to the (N+2)nd row) and three rows in the latter half (the (N+3)rd row to the (N+5)th row) by adjusting the length of the condensing width P.

In other words, when the condensing width P is aligned with the Mth column in FIG. 7, the sum of areas of the apertures 12 (regions painted out with black) of subpixels 11 in the adjacent (M−1)st column and subpixels 11 in the adjacent (M+1)st column included in the range of the condensing width P in the former half is made substantially equal to that the latter half with respect to the same color component by adjusting the length of the condensing width P.

The same is true of the first shape example and the second shape example as well.

Even in the case where the arrangement of subpixels 11 in the row direction is inverted in the row direction between one row and the next row, therefore, the moiré can be reduced and the luminance roughness can be reduced.

In the present embodiment, a stereoscopic image display apparatus having a parallax barrier such as a lenticular sheet provided in front of the display unit has been described. However, the present embodiment is not restricted to this. For example, the present embodiment can also be applied to a stereoscopic image display apparatus capable of conducting changeover display between 2D and 3D by using a lens having a lens effect which can be electrically removed, such as a double refraction lens or a GRIN lens provided in front of the display unit.

Second Embodiment

Figure 8:
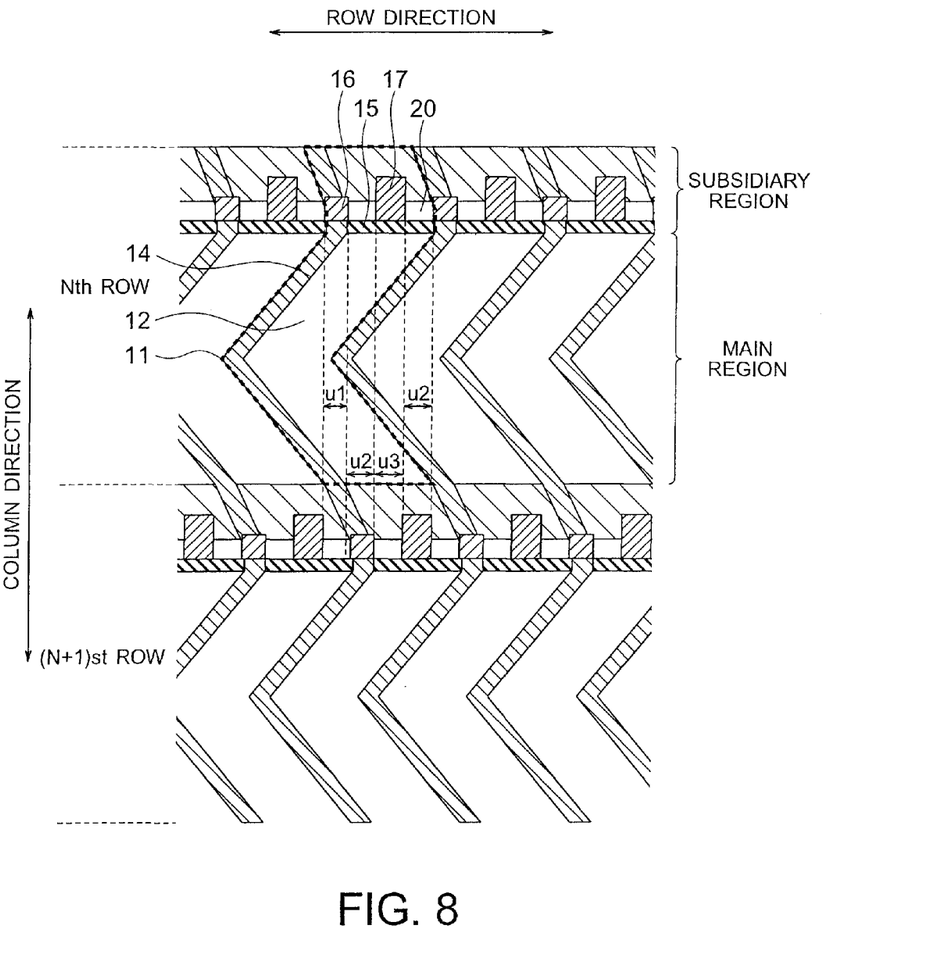
FIG. 8 is a schematic diagram showing details of subpixels 11 in a stereoscopic image display apparatus according to a second embodiment.

FIG. 8 is a schematic diagram showing details of subpixels 11 in a stereoscopic image display apparatus according to a second embodiment. A region surrounded by a dotted line represents one subpixel 11. The subpixel 11 includes an aperture 12, a shield (not illustrated in FIG. 8), and an aperture adjustment region 20. The signal line 14, the signal line 15, the switch element 16 and the electrode 17 are the same as those in the first embodiment.

In one subpixel 11, two regions are defined by using the signal line 15 as a boundary. In FIG. 8, a region below the signal line 15 is defined as "main region" and a region above the signal line 15 is defined as "subsidiary region." The aperture 12 exists in the main region. In FIG. 8, the shape aperture 12 takes the shape of the third shape example. The present embodiment differs from the first embodiment in that the aperture adjustment region 20 which is an aperture of the subpixel 11 is provided in a region other than the disposition positions of the switch element 16 and the electrode 17 in the subsidiary region in order to improve the luminance of the subpixel 11.

The apertures 12 in the main region of a plurality of subpixels in one row have a feature which is similar to that in the first embodiment. In other words, the conditions that adjacent subpixels 11 have a nonoverlapping region and in one row the aperture ratio of the subpixel 11 is constant in any position in the row direction are satisfied.

In the present embodiment, however, the condition that in one row the aperture ratio of the subpixel 11 is constant in any position in the row direction is not satisfied as regards the subsidiary region of the subpixel 11.

In the present embodiment, therefore, the subpixels 11 are arranged to make the sum of aperture ratios over a plurality of rows constant in any position in the row direction. For example, as shown in FIG. 8, subpixels 11 in the Nth row and subpixels 11 in the (N+1)st row are arranged to prevent the aperture adjustment region 20 in the subsidiary region of subpixels 11 in the Nth row and the aperture adjustment region 20 in the subsidiary region of subpixels 11 in the (N+1)st row from overlapping in the column direction. In other words, subpixels are arranged to locate in the column direction the aperture adjustment region 20 in the subsidiary region of subpixels 11 in the (N+1)st row under the aperture adjustment region 20 in the subsidiary region of subpixels 11 in the Nth row. And subpixels are arranged to locate in the column direction the switch element 16 or the electrode 17 in the subsidiary region of subpixels 11 in the (N+1)st row under the aperture adjustment region 20 in the subsidiary region of subpixels 11 in the Nth row.

In the present embodiment, therefore, it is desirable to set a length u1 in the row direction of the switch element 16, a length u3 in the row direction of the electrode 17, and a length u2 in the row direction of the aperture adjustment region 20 equal to each other. Furthermore, it is desirable that each subpixel has a structure in which the switch element 16, the aperture adjustment region 20, the electrode 17 and the aperture adjustment region 20 are arranged in the row direction.

In the stereoscopic image display apparatus according to the present embodiment, therefore, the moiré can be reduced and the luminance roughness can be reduced even in the case where an aperture is provided in the subsidiary region of the subpixel 11. While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A stereoscopic image display apparatus comprising:
   a display device comprising a plurality of subpixels arranged in a first direction and a second direction perpendicular to the first direction to form a matrix, each subpixel having an aperture provided with a color component; and
   an optical controller provided to be opposed to the display device and having a plurality of rectilinear optical apertures extending in the second direction, the plurality of rectilinear optical apertures being arranged in the first direction,
   wherein the apertures in the subpixels adjacent to each other in the first direction have a nonoverlapping region in the second direction and wherein a ratio of a length in the second direction of the aperture to a length in the second direction of the subpixel is substantially constant along the first direction, and
   wherein the aperture has a shape which is linear-symmetric with respect to a symmetry axis parallel to the first direction and which has an odd number of sets of sides having same inclination.

2. The apparatus according to claim 1, wherein the subpixels are arranged in a mosaic arrangement.

3. The apparatus according to claim 1, wherein the aperture has a shape including a first hexagon and a second hexagon concatenated with the first hexagon, the first hexagon has a first parallelogram and a second parallelogram concatenated with the first parallelogram, the first and second parallelograms have respective bases parallel to the first direction, different areas, and mutually parallel sides which intersect the respective bases, the bases of the first and second parallelograms are disposed on one straight line, the second hexagon is linear-symmetrical to the first hexagon about the one straight line serving as a symmetry axis, wherein the first parallelogram has two obtuse-angle triangles such that a diagonal line included in two diagonal lines of the first parallelogram and being shorter in length is a shared side of the two obtuse-angle triangles, and wherein the second parallelogram has two obtuse-angle triangles such that a diagonal line included in two diagonal lines of the second parallelogram and being shorter in length is a shared side of the two obtuse-angle triangles.

4. The apparatus according to claim 1, wherein the aperture has a shape including a first hexagon and a second hexagon concatenated with the first hexagon, the first hexagon includes a first side parallel to the first direction, a second side opposite to the first side, a third side connected to the first side, a fourth side opposite to the third side and connected to the second side, a fifth side connected to the first and fourth sides, and a sixth side opposite to the fifth side and connected to the second and third sides, the first and second sides having a same first length, the third and fourth sides having a same second length, the fifth and sixth sides having a same third length, wherein the second hexagon is linear-symmetrical to the first hexagon about the first side serving as a symmetry axis, and wherein the first hexagon has a first vertex, a second vertex, and a third vertex, the first and second vertexes defining the first side, and the third vertex exists on a straight line which passes through one of the first vertex and the second vertex and which is perpendicular to the first side.

5. The apparatus according to claim 1, wherein the aperture has a shape including a first parallelogram and a second parallelogram concatenated with the first parallelogram, the first parallelogram includes a side parallel to the first direction, the second parallelogram is linear-symmetrical to the first parallelogram about the side serving as a symmetry axis, and wherein the first parallelogram has two obtuse-angle triangles that a diagonal line included in two diagonal lines of the first parallelogram and being shorter in length is a shared side of the two obtuse-angle triangles.

* * * * *